United States Patent
Brake et al.

(10) Patent No.: US 10,657,204 B2
(45) Date of Patent: May 19, 2020

(54) METHOD FOR IMPROVING THE ACCURACY OF A STATEMENT

(71) Applicant: INTERNATIONAL BUSINESS MACHINES CORPORATION, Armonk, NY (US)

(72) Inventors: Kyle M. Brake, Dublin, OH (US); Stephen A. Boxwell, Columbus, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 16/037,711

(22) Filed: Jul. 17, 2018

(65) Prior Publication Data
US 2020/0026754 A1    Jan. 23, 2020

(51) Int. Cl.
*G06F 17/27*    (2006.01)
*G06N 5/00*    (2006.01)

(52) U.S. Cl.
CPC ........ *G06F 17/2785* (2013.01); *G06F 17/273* (2013.01); *G06F 17/274* (2013.01); *G06N 5/00* (2013.01)

(58) Field of Classification Search
CPC ............................ G06F 17/273; G06F 17/2785
See application file for complete search history.

(56) References Cited

U.S. PATENT DOCUMENTS

| | | | |
|---|---|---|---|
| 9,378,272 B1 | 6/2016 | Subramaniam et al. | |
| 9,483,581 B2 | 11/2016 | Garrett et al. | |
| 2006/0293889 A1* | 12/2006 | Kiss | G10L 15/22 704/235 |
| 2012/0078890 A1* | 3/2012 | Fan | G09B 7/00 707/723 |

(Continued)

FOREIGN PATENT DOCUMENTS

CN    102831177 A    12/2012

OTHER PUBLICATIONS

Hasibi, et al., "Entity Linking in Queries: Tasks and Evaluation," Proceedings of the 2015 International Conference on the Theory of Information Retrieval, Sep. 27-30, 2015, pp. 171-180.

*Primary Examiner* — Samuel G Neway
(74) *Attorney, Agent, or Firm* — Conley Rose, P.C.

(57) ABSTRACT

A cognitive assistant system, computer program product, and computer-implemented method configured to improve the accuracy of a statement. In one example, the system receives from a user an original statement that includes statement entities and generates an original confidence estimate (CE) for a correctness of the original statement. The system generates a replacement statement by selecting a suspect statement entity, selecting a replacement entity for the suspect statement entity, and replacing the suspect statement entity with the replacement entity in the original statement. The system generates a replacement CE for a correctness of the replacement statement. If the replacement CE exceeds the original CE by a tuning factor, the system sends the replacement statement to the user. If not, the (Continued)

system repeats generating the replacement statement and generating the replacement CE.

20 Claims, 4 Drawing Sheets

(56) References Cited

U.S. PATENT DOCUMENTS

| | | | | |
|---|---|---|---|---|
| 2012/0166942 A1* | 6/2012 | Ramerth | ............... | G06F 17/241 |
| | | | | 715/257 |
| 2013/0173260 A1 | 7/2013 | Ahmadshahi | | |
| 2014/0208230 A1* | 7/2014 | Stanley | ................ | G06F 17/273 |
| | | | | 715/753 |
| 2016/0019293 A1* | 1/2016 | Bhagwat | ............. | G06F 16/3344 |
| | | | | 707/732 |
| 2016/0110339 A1* | 4/2016 | Yamano | ................ | G06F 17/273 |
| | | | | 704/9 |
| 2018/0039608 A1* | 2/2018 | Sharifi | .................... | G06F 17/24 |
| 2019/0311031 A1* | 10/2019 | Powell | ................ | G06F 17/2715 |
| 2019/0370323 A1* | 12/2019 | Davidson | ............ | G06F 16/3347 |

* cited by examiner

METHOD FOR IMPROVING THE ACCURACY OF A STATEMENT

BACKGROUND

The present disclosure relates generally to Cognitive Assistant (CA) systems. CA systems provide support to a user in searching for information or making decisions. A CA system may include natural language processing (NLP), which is the ability of a computer program to understand human speech as it is spoken or written. One such CA system is the IBM Watson™ system available from International Business Machines (IBM) Corporation of Armonk, N.Y.

SUMMARY

The present disclosure includes various embodiments including a CA system, a computer-implemented method, and a computer program product for improving the accuracy (or correctness) of a statement. The disclosed embodiments seek to improve a CA system by selecting a suspect entity in a statement received by the CA system and generating a replacement statement by substituting a replacement entity for the suspect entity in the statement.

As an example, the disclosed embodiments include a computer-implemented method performed by a CA system for improving the accuracy of a statement. The computer-implemented method includes the step of receiving from a user an original statement that includes a plurality of statement entities. The computer-implemented method generates an original confidence estimate (CE) for a correctness of the original statement. The computer-implemented method generates a replacement statement by selecting a suspect statement entity in the plurality of statement entities, selecting a replacement entity for the suspect statement entity, and replacing the suspect statement entity with the replacement entity in the original statement. The computer-implemented method generates a replacement CE for a correctness of the replacement statement. If the replacement CE exceeds the original CE by a tuning factor, the computer-implemented method sends the replacement statement to the user. If the replacement CE does not exceed the original CE by the tuning factor, the computer-implemented method repeats generating the replacement statement and generating the replacement CE.

The disclosed embodiments also include a CA system configured to improve the accuracy of a statement. In one embodiment, the system includes memory that stores instructions, and a processor configured to execute the instructions to receive from a user an original statement comprising a plurality of statement entities. The processor further executes instructions to generate an original confidence estimate (CE) for a correctness of the original statement. The processor executes instructions to generate a replacement statement by selecting a suspect statement entity in the plurality of statement entities, selecting a replacement entity for the suspect statement entity, and replacing the suspect statement entity with the replacement entity in the original statement. The processor further executes instructions to generate a replacement CE for a correctness of the replacement statement. If the replacement CE exceeds the original CE by a tuning factor, the processor executes instructions to send the replacement statement to the user. If the replacement CE does not exceed the original CE by the tuning factor, the processor executes instructions to repeat generating the replacement statement and generating the replacement CE.

Another disclosed embodiment is a computer program product comprising a computer readable storage medium having program instructions embodied therewith, the program instructions executable by a processor. The instructions, when executed by the computer, cause the processor to receive from a user an original statement comprising a plurality of statement entities. The instructions, when executed by the computer, cause the processor to generate an original confidence estimate (CE) for a correctness of the original statement. The instructions, when executed by the computer, cause the processor to generate a replacement statement by selecting a suspect statement entity in the plurality of statement entities, selecting a replacement entity for the suspect statement entity, and replacing the suspect statement entity with the replacement entity in the original statement to generate the replacement statement. The instructions, when executed by the computer, cause the processor to generate a replacement CE for a correctness of the replacement statement. The instructions, when executed by the computer, cause the processor, if the replacement CE exceeds the original CE by a tuning factor, to send the replacement statement to the user. The instructions, when executed by the computer, cause the processor, if the replacement CE does not exceed the original CE by the tuning factor, to repeat generating the replacement statement and generating the replacement CE.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
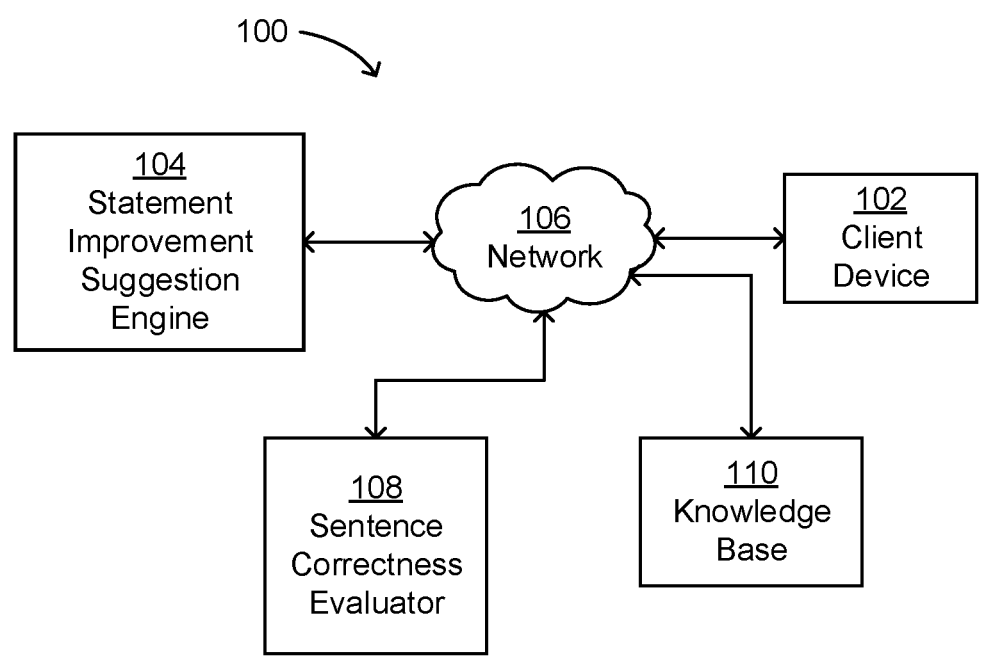
FIG. 1 is a high-level system block diagram of a CA system according to an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

As referenced herein, the term database or knowledge base is defined as collection of structured or unstructured data. Although referred in the singular form, the database may include one or more databases, and may be locally stored on a system or may be operatively coupled to a system via a local or remote network.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

Also, as used herein, the term "communicatively coupled" means capable of sending and/or data over a communication link. The communication link may include both wired and wireless links, and may be a direct link or may comprise of multiple links passing through one or more communication network devices such as, but not limited to, routers, firewalls, servers, and switches. The network device may be located on various types of networks such as local-area networks (LANs), wide-area networks (WANs), and metropolitan-area networks (MANs). The networks may include private networks and/or public networks such as the Internet. Additionally, in certain embodiments, communication links may also encompass internal communication between various components of a system and/or with an external input/output device such as a keyboard or display device.

FIG. 1 is a high-level system block diagram of a CA system 100 according to an embodiment of the present disclosure. The CA system 100 includes a client device 102, a statement improvement suggestion engine (SISE) 104, a sentence correctness evaluator (SCE) 108, and a knowledge base 110. The SISE 104 includes and/or is communicatively coupled to the SCE 108 and/or the knowledge base 110 via a network 106. The client device 102 is communicatively coupled to the SISE 104 via the network 106.

The SCE 108 (which may also be referred to as a yes/no pipeline) receives a statement and returns a true/false indication (an answer) for the statement and a value ce, where ce is a value for a confidence estimate (CE) on the correctness of the answer. Thus, the answer and its associated ce provide a correctness estimate for the statement.

Examples of systems that evaluate a question and provide an answer with an associated ce are described in U.S. Patent Application Publication 2015/0044660, titled "Caching Natural Language Questions and Results in a Question and Answer System," U.S. Patent Application Publication 2015/0058329, titled "Clarification of Submitted Questions in a Question and Answer System," and U.S. Patent Application Publication 2017/0293679, titled "Natural Language Processing Based on Textual Polarity," each of which is incorporated herein by reference. Such a question/answer system may perform as an evaluator of declarative statement by converting a received declarative statement into a true/false question and providing an answer of "true" or "false" with an associated ce for the true/false question as an evaluation of the received declarative statement. Such conversion of a declarative sentence to a question may occur in the SISE 104 or in the SCE 108.

Often a question/answer system expresses its ce as a value between 0 and 1. Either in the SISE 104 or in the SCE 108, a combined response of true/false answer and ce may be converted to a single measure of confidence by returning ce when the answer is "true" and the value 1−ce when the answer is "false." Such a single measure of confidence may also be referred to as a correctness value.

The knowledge base 110 contains a collection or corpus of data, documents, or other works, which may include structured and unstructured data. In one embodiment, the knowledge base 110 is a graph database that stores a knowledge graph that describes the data in the knowledge base based on their relations. The knowledge graph may be generated from an existing knowledge graph such as, but not limited to, Yago™ and/or Freebase™. Alternatively, the knowledge graph may be generated by administrators without the use of a prior knowledge graph.

In some embodiments, the knowledge base 110 provides all of the following functions. In other embodiments, one or more of these functions may be provided by another element of the cognitive assistant system 100, including an element not shown in FIG. 1.

In a first function, the knowledge base 110 may be presented with two or more entities and return a list of strengths of connections between pairs of the presented entities. Non-limiting examples of strength of connection include a count of a number of connections between entities (where a high number of connections indicates a high connection strength) and a summation of weighted connections between entities (where a high total value indicates a high connection strength).

In a second function, the knowledge base 110 may be presented with one or more entities and return a list of one or more entity types (or categories) for each presented entity. For example, for the entity "Ford's Theatre," the list of entity types returned might include "building," "playhouse," "historic location," "Washington DC theatre," and others. The knowledge base 110 may additionally return a count of the number of entities in the knowledge base 110 that are included in each returned entity type.

In a third function, the knowledge base 110 may be presented with an entity type and return a list of one or more entities that have the presented entity type.

The SISE 104 is also communicatively coupled to the client device 102. The client device 102 may be an end user device or may be another system that is configured to utilize the SISE 104. Non-limiting examples of client device 102 include a personal computer (desktop or laptop), mobile devices (e.g., personal digital assistant (PDA), smart phone, tablet), and network servers. A user of the cognitive assistant system 100 submits a question or declarative statement to the SISE 104 using the client device 102. In the following description, an embodiment of the disclosure is described for a declarative statement received from the user; however, it will be understood that in other embodiments the method of the disclosure may be used with a question.

Figure 2:
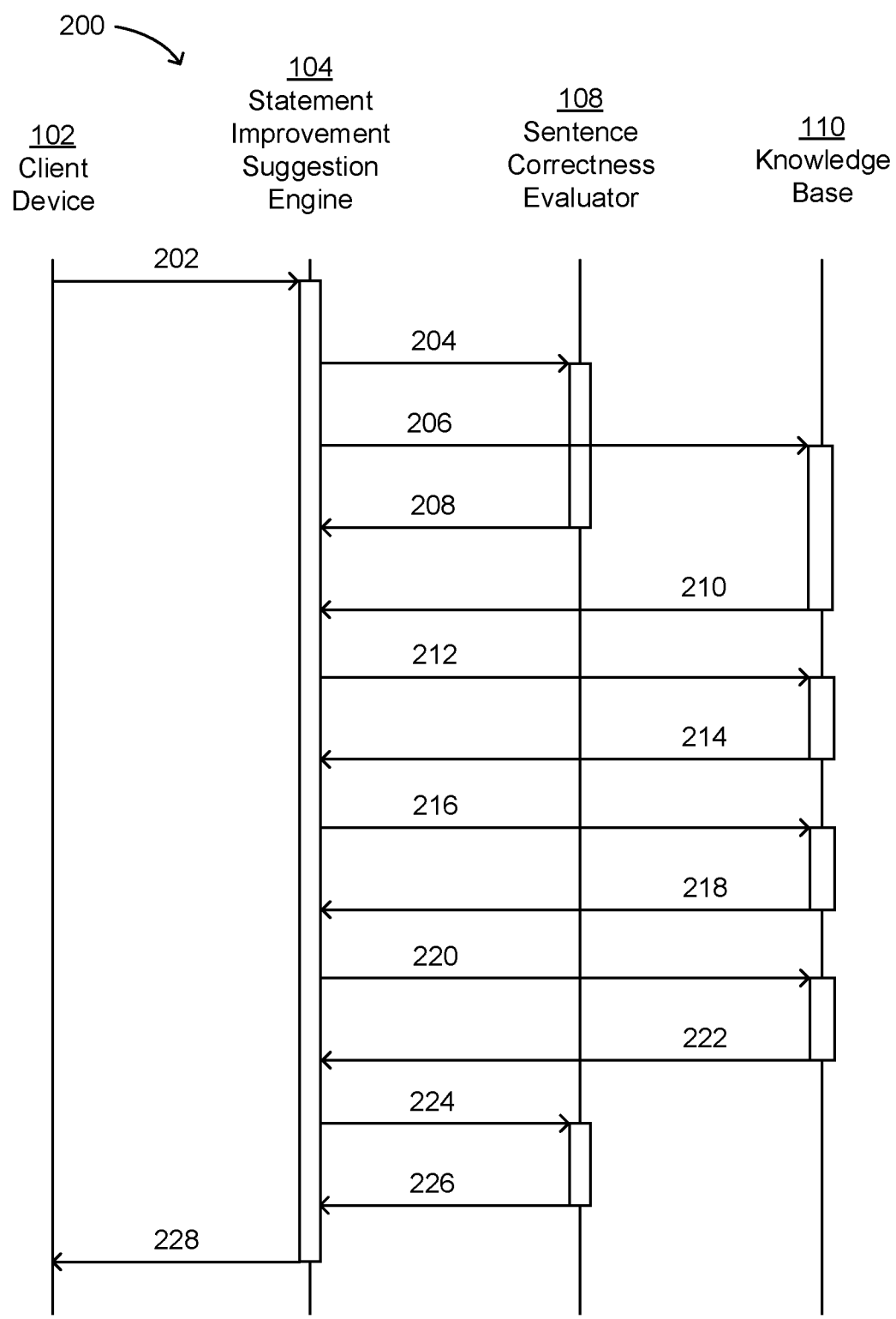
FIG. 2 is a sequence diagram of messages within a CA system according to an embodiment of the present disclosure.

FIG. 2 is a sequence diagram 200 of messages within a CA system (e.g., CA system 100) according to an embodiment of the present disclosure. The SISE 104 is configured to execute instructions for processing an original statement received from the client device 102 in message 202 and, where needed, instructions for generating a suggestion for improving a correctness of the original statement using an evaluation of the correctness obtained from the SCE 108 and information contained in the knowledge base 110. In message 204, the SISE 104 sends the original statement to the SCE 108 and, in message 208, receives in reply an original ce for the original statement. In some embodiments, if the original ce exceeds a threshold value, the SISE 104 considers the original statement sufficiently correct and, in message 228, sends the client device 102 an indication that the original statement is correct and waits to receive another statement.

In other embodiments, regardless of the value of the original ce, the SISE 104 attempts to improve the correctness of the original statement. To do this, the SISE 104 generates a replacement statement to replace the original statement and generates a replacement ce for the replacement statement. If the replacement ce exceeds the original ce by a predetermined amount (a tuning factor), the SISE 104 sends the replacement statement to the client device 102 in the message 228 as a suggested improved statement. The tuning factor may be set by a user of the cognitive assistant system 100. If the replacement ce does not exceed the original ce by the tuning factor, the SISE 104 repeats the process of generating replacement statements and replacement ce values until a replacement statement is found having a replacement ce exceeding the original ce by the tuning factor, or until the process has been repeated more than a predetermined number of times.

The SISE 104 generates a replacement statement by identifying statement entities in the original statement (original statement entities), selecting one of the original statement entities as a suspect entity, finding a replacement entity for the suspect entity, and replacing the suspect entity with the replacement entity in the original statement to generate the replacement statement.

For example, the SISE 104 may receive the original statement "John Wilkes Booth murdered John F. Kennedy in Ford's Theatre." From that original statement, the SISE 104 identifies an original statement entities list that includes "John Wilkes Booth," "murder," "John F. Kennedy," and "Ford's Theatre." In some embodiments, the SISE 104 uses a syntactic parser to identify statement entities.

In message 206, the SISE 104 sends the original statement entities list to the knowledge base 110 and, in message 210, receives in reply a connection strengths list that indicate a connection strength between each pair of original statement entities. Table 1 shows the original statement entities and connection strengths for the original statement. The connection strength between "John F. Kennedy" and "Ford's Theatre" is likely low, depending on whether (or how often) JFK attended/visited Ford's Theatre. The connection strength between "murder" and "Ford's Theatre" is likely low, depending on how many other murders were committed at Ford's Theatre.

TABLE 1

| First Entity | Second Entity | Connection Strength |
| --- | --- | --- |
| "murder" | "John Wilkes Booth" | High |
| | "John F. Kennedy" | High |
| | "Ford's Theatre" | Low |

TABLE 1-continued

| First Entity | Second Entity | Connection Strength |
| --- | --- | --- |
| "John Wilkes Booth" | "Ford's Theatre" | High |
| | "John F. Kennedy" | Very Low |
| "Ford's Theatre" | "John F. Kennedy" | Low |

Having received the connection strengths list in message 210, the SISE 104 selects one of the original statement entities as a suspect entity. In some embodiments, the SISE 104 selects as a suspect entity an entity having a lowest combined connection strength with other original statement entities. In Table 2, it may be seen that "John F. Kennedy" has the lowest combined connection strength with other original statement entities. Thus, the SISE 104 selects "John F. Kennedy" as the suspect entity in the original statement.

TABLE 2

| First Entity | Second Entity | Connection Strength |
| --- | --- | --- |
| "murder" | "John Wilkes Booth" | High |
| | "John F. Kennedy" | High |
| | "Ford's Theatre" | Low |
| "John Wilkes Booth" | "murder" | High |
| | "Ford's Theatre" | High |
| | "John F. Kennedy" | Very Low |
| "Ford's Theatre" | "John Wilkes Booth" | High |
| | "murder" | Low |
| | "John F. Kennedy" | Low |
| "John F. Kennedy" | "murder" | High |
| | "Ford's Theatre" | Low |
| | "John Wilkes Booth" | Very Low |

The SISE 104 next attempts to find a replacement entity for the suspect entity. In message 212, the SISE 104 sends the suspect entity "John F. Kennedy" to the knowledge base 110 and, in message 214, receives in reply a list of entity types that apply to the entity. In this case, the knowledge base 110 might reply with a list that includes the entity types shown in Table 3. In some embodiments, the knowledge base 110 includes in its reply a type size (or entity count value) for each entity type, representing the number of entities in the knowledge base 110 that have that entity type.

TABLE 3

| Entity Type | Type Size |
| --- | --- |
| Human | ~7.6 billion |
| Man | ~3.8 billion |
| Husband | ~2.1 billion |
| U.S. Senator | 1,971 |
| U.S. President | 45 |

The SISE 104 selects one of the entity types returned by the knowledge base 110 as a candidate type. In some embodiments, the SISE 104 selects the entity type with the smallest type size as the candidate type. In this example, the entity type "U.S. President" would be chosen as the candidate type.

In message 216, the SISE 104 sends the candidate type "U.S. President" to the knowledge base 110 and, in message 218, receives in reply a list of candidate entities that have the type "U.S. President". The SISE 104 substitutes each of the candidate entities, in turn, for the entity "John F. Kennedy" in the original statement entities list to generate a collection of candidate statement entities lists. There will be as many candidate statement entities lists in the collection as there are candidate entities in the list of candidate entities returned by the knowledge base 110.

In a series of messages 220, the SISE 104 sends each candidate statement entities list to the knowledge base 110 and, in a corresponding series of messages 222, receives in reply a connection strengths list for each candidate statement entities list. The SISE 104 selects as the replacement entity the candidate entity having a highest combined connection strength with the other statement entities in the candidate statement entities list. In this example, the entity "Abraham Lincoln" has the highest combined connection strength with the entities "John Wilkes Booth," "murder," and "Ford's Theatre" and is selected as the replacement entity.

Having selected a replacement entity, the SISE 104 replaces the suspect entity with the replacement entity in the original statement to generate the replacement statement. In this example, the replacement statement is "John Wilkes Booth murdered Abraham Lincoln in Ford's Theatre." In message 224, the SISE 104 sends the replacement statement to the SCE 108 and, in message 226, receives in reply a replacement ce for the replacement statement. In this example, the SISE 104 receives a high replacement ce value for the replacement sentence "John Wilkes Booth murdered Abraham Lincoln in Ford's Theatre." As described previously, if the replacement ce exceeds the original ce by the tuning factor, in message 228, the SISE 104 sends the replacement statement to the client device 102 as a suggested improved statement.

If not, the SISE 104 repeatedly iterates through the process of generating replacement statements and replacement ce values until a replacement statement is found having a replacement ce exceeding the initial ce by the tuning factor, or until the process has been repeated more than a predetermined number of times. In one round of repetitions, the SISE 104 may select as replacement entities the candidate entities having successively lower combined connection strengths with the other statement entities in the candidate statement entities list. In another round of repetitions, the SISE 104 may select as candidate types the entity types with successively larger type size. In yet another round of iterations, the SISE 104 may select as suspect entity the entities having successively higher combined connection strength with other original statement entities.

Figure 3:
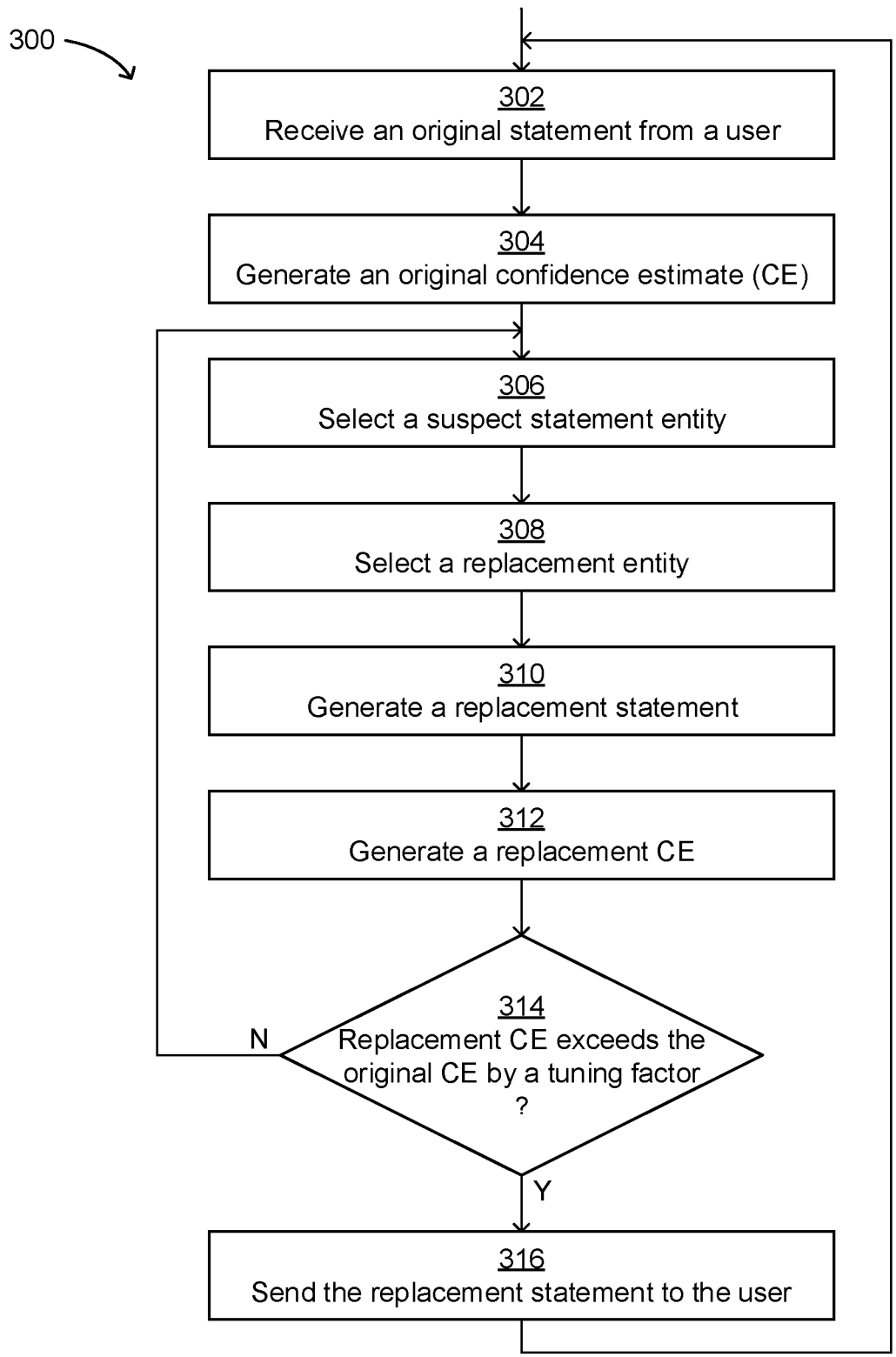
FIG. 3 is a flowchart of a computer-implemented method for improving the accuracy of a statement according to an embodiment of the present disclosure.

FIG. 3 is a flowchart of a computer-implemented method 300 for improving the accuracy of a statement according to an embodiment of the present disclosure. For convenience, the method 300 is explained as if performed by the elements of the CA system 100 described with reference to FIG. 1.

In step 302, the SISE 104 receives an original statement for improvement from the client device 102. In step 304, the SISE 104 sends the original statement to the SCE 108 and receives in return an original ce for the original statement.

In step 306, the SISE 104 selects a suspect entity from the original statement entities. In some embodiments, the SISE 104 sends the original statement entities to the knowledge graph 110 to determine connection strengths between pairs of original statement entities. The SISE 104 then selects the statement entity having the lowest connection strength with other original statement entities as the suspect statement entity.

In step 308, the SISE 104 selects a replacement entity. In some embodiments, the SISE 104 determines a type of the suspect entity, finds one or more candidate entities of the same type, and selects as the replacement entity the candidate entity having the highest connection strength with the other original statement entities. In some embodiments, the SISE 104 determines a plurality of candidate types for the suspect entity and selects one of those types as the type of the suspect entity. In some embodiments, the SISE 104 sends the suspect entity to the knowledge graph 110 to determine the type of the suspect entity, sends the type of the suspect entity to the knowledge graph 110 to find the one or more candidate entities of the same type, and sends each of the candidate entities and the other original statement entities to the knowledge graph 110 to determine connection strengths between each candidate entity and the other original statement entities.

In step 310, the SISE 104 replaces the suspect entity in the original statement with the replacement entity to generate the replacement statement. In step 312, the SISE 104 sends the replacement statement to the SCE 108 and receives in reply a replacement ce for the replacement statement.

In step 314, the SISE 104 determines whether the replacement ce exceeds the original ce by more than the tuning factor. If so, in step 316 the SISE 104 returns the replacement statement to the user as a suggested improvement over the original statement and returns to step 302 to await receipt of another statement from the user. If, at step 314 the replacement ce does not exceed the original ce by more than the tuning factor, the SISE 104 returns to a previous step to perform some portion(s) of the method 300 again. The SISE 104 may choose a different replacement entity, choose a different candidate type, or choose a different suspect entity. FIG. 3 shows method 300 returning to step 306 when the replacement ce does not exceed the original ce by more than the tuning factor, however it will be understood that method 300 may instead return to step 308.

In a portion of the method 300 not shown in FIG. 3, in step 314, the SISE 104 may also determine whether the steps of selecting a suspect entity and a replacement entity have been iterated more than a predetermined number of times. If so, the SISE 104 may send the user a message indicating its inability to suggest an improved statement and return step 302 to await receipt of another statement from the user.

Figure 4:
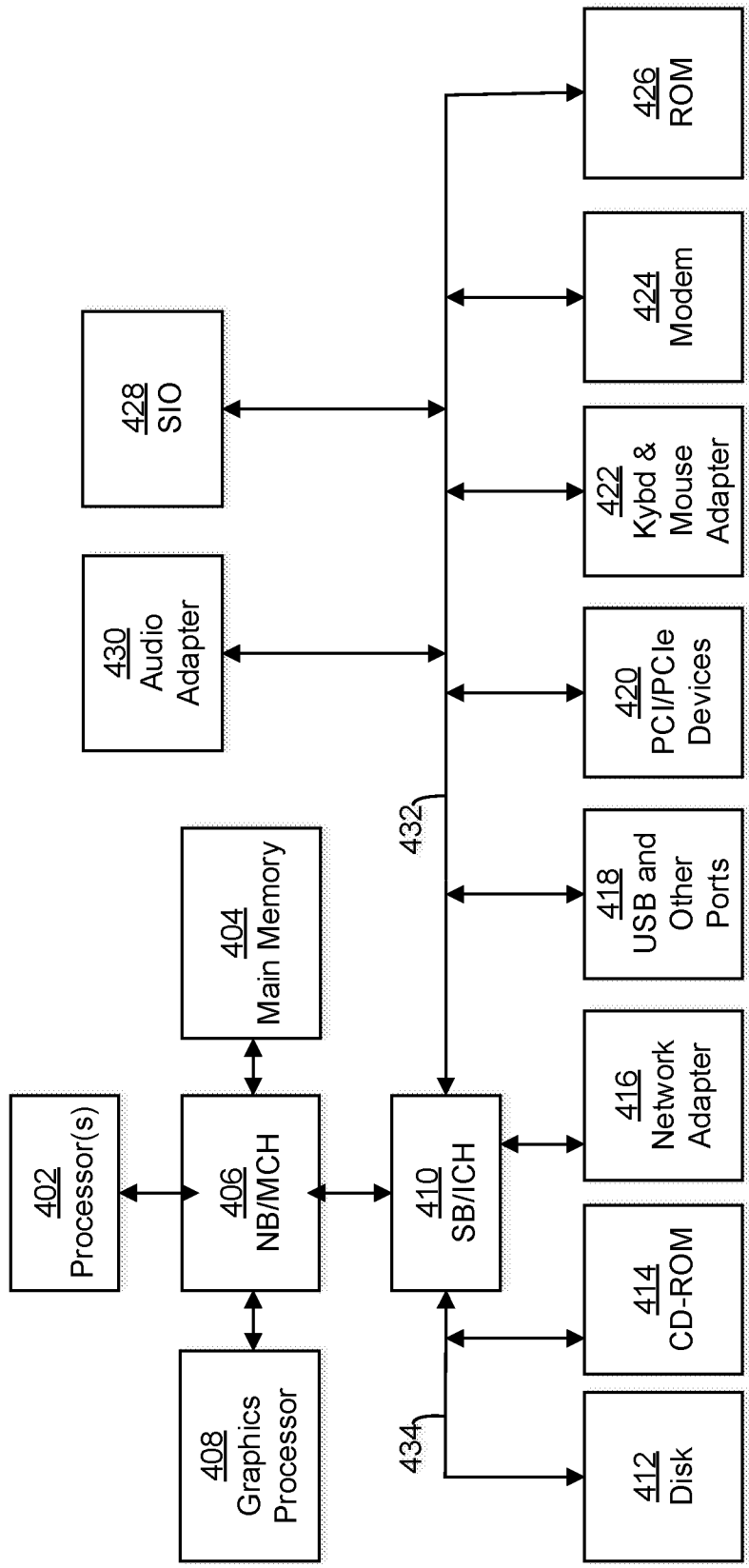
FIG. 4 is a block diagram illustrating a high-level hardware architecture of a statement improvement suggestion system according to an embodiment of the present disclosure.

FIG. 4 is a block diagram of an example data processing system 400 in which aspects of the illustrative embodiments may be implemented. For example, in one embodiment, SISE 104 or any other element of CA system 100 may be implemented using data processing system 400. Although data processing system 400 depicts the basic components of a computing system, the disclosed embodiments may also be implemented in very advanced systems such as an IBM® power server or the IBM Watson™ supercomputer, which employs a cluster of IBM power servers.

In the depicted example, the data processing system 400 employs a hub architecture including northbridge and memory controller hub (NB/MCH) 406 and southbridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP). A computer bus, such as bus 432 or bus 434, may be implemented using any type of communication fabric or architecture that provides for a transfer of data between different components or devices attached to the fabric or architecture.

In the depicted example, network adapter 416 connects to SB/ICH 410. Audio adapter 430, keyboard and mouse adapter 422, modem 424, read-only memory (ROM) 426, hard disk drive (HDD) 412, compact disk read-only memory (CD-ROM) drive 414, universal serial bus (USB) ports and other communication ports 418, and peripheral component interconnect/peripheral component interconnect express (PCI/PCIe) devices 420 connect to SB/ICH 410 through bus 432 and bus 434. PCI/PCIe devices may include, for example, Ethernet adapters, add-in cards, and PCI cards for notebook computers. PCI uses a card bus controller, while PCIe does not. ROM 426 may be, for example, a flash basic input/output system (BIOS). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. In some embodiments, HDD 412 may be replaced by other forms of data storage devices including, but not limited to, solid-state drives (SSDs).

A super I/O (SIO) device 428 may be connected to SB/ICH 410. SIO device 428 may be a chip on the motherboard that is configured to assist in performing less demanding controller functions for the SB/ICH 410 such as controlling a printer port, controlling a fan, and/or controlling the small light emitting diodes (LEDS) of the data processing system 400.

The data processing system 400 may include a single processor 402 or may include a plurality of processors 402. Additionally, processor(s) 402 may have multiple cores. For example, in one embodiment, data processing system 400 may employ a large number of processors 402 that include hundreds or thousands of processor cores. In some embodiments, the processors 402 may be configured to perform a set of coordinated computations in parallel.

An operating system is executed on the data processing system 400 using the processor(s) 402. The operating system coordinates and provides control of various components within the data processing system 400 in FIG. 4. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, may be executed on the data processing system 400.

Instructions for the operating system, applications, and other data are located on storage devices, such as one or more HDD 412, and may be loaded into main memory 404 for execution by processor(s) 402. In some embodiments, additional instructions or data may be stored on one or more external devices. The processes described herein for the illustrative embodiments may be performed by processor(s) 402 using computer usable program code, which may be located in a memory such as, for example, main memory 404, ROM 426, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be apparent from the foregoing that the disclosed embodiments have significant advantages over current art. As an example, disclosed embodiments propose a single suggested improved statement to a user, unlike systems that present a user with multiple semantically related statements to an input statement or multiple interpretations of an ambiguous input statement. Disclosed embodiments improve the efficiency of a CA system because the correctness of statements can be improved before being added to a knowledge graph or used in a making a decision. Users may more effectively search for information in casual written content such as microblogs if statements in the content are improved before searching.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by a cognitive assistant (CA) system for improving an accuracy of a statement, comprising:
   receiving from a user an original statement comprising a plurality of statement entities;
   generating an original confidence estimate (CE) for a correctness of the original statement;
   generating a replacement statement by:
      selecting a suspect statement entity in the plurality of statement entities;
      selecting a replacement entity for the suspect statement entity; and
      replacing the suspect statement entity with the replacement entity in the original statement to generate a replacement statement;
   generating a replacement CE for a correctness of the replacement statement;
   sending the replacement statement to the user when the replacement CE exceeds the original CE by a tuning factor; and
   repeating generating the replacement statement and generating the replacement CE when the replacement CE does not exceed the original CE by the tuning factor.

2. The computer-implemented method of claim 1, wherein generating the replacement statement and generating the replacement CE are repeated no more than a predetermined number of times.

3. The computer-implemented method of claim 1, wherein the tuning factor is set by the user.

4. The computer-implemented method of claim 1, wherein the original CE and the replacement CE are generated using a yes/no pipeline.

5. The computer-implemented method of claim 1, wherein selecting the suspect statement entity comprises:
   determining connection strengths between each pair of statement entities in the plurality of statement entities using a knowledge graph; and
   selecting as the suspect statement entity a statement entity in the plurality of statement entities having a lowest connection strength with other statement entities in the plurality of statement entities.

6. The computer-implemented method of claim 5, wherein selecting the replacement entity for the suspect statement entity comprises:
   determining a type of the suspect statement entity;
   finding one or more candidate entities having the same type as the suspect statement entity using the knowledge graph;
   determining connection strengths between each of the one or more candidate entities and the statement entities other than the suspect statement entity in the plurality of statement entities using a knowledge graph; and
   selecting as the replacement entity the candidate entity having a highest connection strength with the statement entities other than the suspect statement entity in the plurality of statement entities.

7. The computer-implemented method of claim 6, wherein determining the type of the suspect statement entity comprises:
   determining a plurality of candidate types for the suspect statement entity and a corresponding type size for each of the plurality of candidate types; and selecting a candidate type having the smallest type size as the type of the suspect statement entity.

8. A cognitive assistant (CA) system configured to improve an accuracy of a statement, the CA system comprising memory for storing instructions, and a processor configured to execute the instructions to:
receive from a user an original statement comprising a plurality of statement entities;
generate an original confidence estimate (CE) for a correctness of the original statement;
generate a replacement statement by:
selecting a suspect statement entity in the plurality of statement entities;
selecting a replacement entity for the suspect statement entity;
replacing the suspect statement entity with the replacement entity in the original statement to generate the replacement statement;
generate a replacement CE for a correctness of the replacement statement;
send the replacement statement to the user when the replacement CE exceeds the original CE by a tuning factor; and
repeat generating the replacement statement and generating the replacement CE when the replacement CE does not exceed the original CE by the tuning factor.

9. The CA system of claim 8, wherein the processor is configured to execute the instructions to repeat generating the replacement statement and generating the replacement CE no more than a predetermined number of times.

10. The CA system of claim 8, wherein the tuning factor is set by the user.

11. The CA system of claim 8, wherein the processor is configured to execute the instructions to:
send the original statement to a yes/no pipeline to generate the original CE; and
send the replacement statement to the yes/no pipeline to generate the replacement CE.

12. The CA system of claim 8, wherein the processor is configured to execute the instructions to:
send the plurality of statement entities to a knowledge graph to determine connection strengths between each pair of statement entities in the plurality of statement entities; and
select as the suspect statement entity a statement entity in the plurality of statement entities having a lowest connection strength with other statement entities in the plurality of statement entities.

13. The CA system of claim 12, wherein the processor is configured to execute the instructions to:
determine a type of the suspect statement entity;
send the type of the suspect statement entity to the knowledge graph to find one or more candidate entities having the same type as the suspect statement entity;
for each of the one or more candidate entities:
substitute the candidate entity for the suspect entity in the plurality of statement entities to create a candidate entities list; and
send the candidate entities list to the knowledge graph to determine connection strengths between each pair of statement entities in the candidate entities list; and
select as the replacement entity the candidate entity having a highest connection strength with the statement entities in its candidate entities list.

14. The CA system of claim 13, wherein the processor is configured to execute the instructions to:
determine a plurality of candidate types for the suspect statement entity and a corresponding type size for each of the plurality of candidate types; and
selecting a candidate type having the smallest type size as the type of the suspect statement entity.

15. A computer program product for improving an accuracy of a statement, the computer program product comprising a computer readable storage medium having program instructions embodied therewith, the program instructions executable by a processor to cause the processor to:
receive from a user an original statement comprising a plurality of statement entities;
generate an original confidence estimate (CE) for a correctness of the original statement;
generate a replacement statement by:
selecting a suspect statement entity in the plurality of statement entities;
selecting a replacement entity for the suspect statement entity;
replacing the suspect statement entity with the replacement entity in the original statement to generate the replacement statement;
generate a replacement CE for a correctness of the replacement statement;
send the replacement statement to the user when the replacement CE exceeds the original CE by a tuning factor; and
repeat generating the replacement statement and generating the replacement CE when the replacement CE does not exceed the original CE by the tuning factor.

16. The computer program product of claim 15, wherein the tuning factor is set by the user.

17. The computer program product of claim 15, the program instructions executable by the processor to cause the processor to:
send the original statement to a yes/no pipeline to generate the original CE; and
send the replacement statement to the yes/no pipeline to generate the replacement CE.

18. The computer program product of claim 17, the program instructions executable by the processor to cause the processor to:
send the plurality of statement entities to a knowledge graph to determine connection strengths between each pair of statement entities in the plurality of statement entities; and
select as the suspect statement entity a statement entity in the plurality of statement entities having a lowest connection strength with other statement entities in the plurality of statement entities.

19. The computer program product of claim 18, the program instructions executable by the processor to cause the processor to:
determine a type of the suspect statement entity;
send the type of the suspect statement entity to the knowledge graph to find one or more candidate entities having the same type as the suspect statement entity;
for each of the one or more candidate entities:
substitute the candidate entity for the suspect entity in the plurality of statement entities to create a candidate entities list; and
send the candidate entities list to the knowledge graph to determine connection strengths between each pair of statement entities in the candidate entities list; and select as the replacement entity the candidate entity having a highest connection strength with the statement entities in its candidate entities list.

20. The computer program product of claim 19, the program instructions executable by the processor to cause the processor to:
- determine a plurality of candidate types for the suspect statement entity and a corresponding type size for each of the plurality of candidate types; and
- selecting a candidate type having the smallest type size as the type of the suspect statement entity.

* * * * *